United States Patent [19]
Jang et al.

[11] Patent Number: 5,585,001
[45] Date of Patent: Dec. 17, 1996

[54] WASTE WATER TREATMENT METHOD EMPLOYING A CONTINUOUS RESPIRATION METER AND AN APPARATUS THEREOF

[75] Inventors: Bong K. Jang, Ulsan; Chang W. Kim, Pusan, both of Rep. of Korea

[73] Assignee: Samsung Petrochemical Co., Ltd., Ulsan, Rep. of Korea

[21] Appl. No.: 340,310

[22] Filed: Nov. 14, 1994

[30] Foreign Application Priority Data

Nov. 24, 1993 [KR] Rep. of Korea ................ 1993-25112

[51] Int. Cl.$^6$ .................................................. C02F 3/12
[52] U.S. Cl. ..................... 210/614; 210/620; 210/103; 210/143
[58] Field of Search ..................... 210/607, 614, 210/620, 103, 143, 202, 209, 220, 195.1

[56] References Cited

U.S. PATENT DOCUMENTS

| | | | |
|---|---|---|---|
| 4,329,232 | 5/1982 | McKenna | 210/620 |
| 4,620,930 | 11/1986 | McDowell | 210/614 |
| 4,783,750 | 11/1988 | Smith | 210/614 |
| 5,106,511 | 4/1992 | Kodukula | 210/614 |
| 5,296,147 | 3/1994 | Koster et al. | 210/614 |

FOREIGN PATENT DOCUMENTS

| | | |
|---|---|---|
| 2532199 | 1/1977 | Germany . |
| 55-97290 | 7/1980 | Japan . |
| 57-75190 | 5/1982 | Japan . |
| 2-68196 | 3/1990 | Japan . |

*Primary Examiner*—Christopher Upton
*Attorney, Agent, or Firm*—Foley & Lardner

[57] ABSTRACT

Disclosed herein is a method for treating a waste water comprising a high concentration of organic substances in a stable and controllable manner and an apparatus therefor.

The method comprises the steps of determining continuously a dissolved oxygen(DO) within a reactor in which the waste water is biologically degraded by using a continous respiration meter; determining a relationship between a loading rate and a respiration rate by using the DO value transmitted as an electrical signal from the respiration meter, establishing a set loading rate which is optimum for the reactor, and controlling the waste water input flow rate into the reactor in order to maintain a loading rate of the influent waste water is to be close to the set loading rate. The apparatus comprises a continous respiration meter for detecting the DO within a reactor and a control part for determining a relationship between a loading rate and a respiration rate and controlling the waste water input flow rate into the reactor.

7 Claims, 5 Drawing Sheets

WASTE WATER TREATMENT METHOD EMPLOYING A CONTINUOUS RESPIRATION METER AND AN APPARATUS THEREOF

TECHNICAL FIELD

The present invention is related to a waste water treatment method employing a continuous respiration meter and an apparatus for carrying the same, and particularly is related to a method and an apparatus for treating waste water by automatically controlling the influent waste water flow rate in the basis of the interrelation between a loading rate and a respiration rate, which is derived by using a dissolved oxygen(DO) measured with the continuous respiration meter so that the waste water can be treated in a stable, efficient, and economic way for a long period of time.

BACKGROUND OF THE INVENTION

Recently, biological treatment techniques of waste water have been widely used for preventing water pollution resulting from the accumulation of organic substances. Known biological treatment methods of waste water typically include: (1) an activated sludge type process; and (2) a biological fixed film type process.

Among these processes an activated sludge type process in which an aqueous suspension of microorganisms is utilized is most prevalent for purifying waste water such as sewage, various kinds of industrial waste water and the like.

An apparatus for a typical activated sludge type process is shown in FIG. 1. Waste water containing organic substances is fed via an influent(input) line (32) by a pump (31) into aeration tanks (3a, 3b, 3c) and the organic substances is degraded by the microorganisms grown in the tanks(3a, 3b, 3c). Air is supplied through a blower (4) into the aeration tanks (3a, 3b, 3c) and dissolved into the waste water. The treated water flows into a final clarifier (6a, 6b) through an effluent line (6), is separated from the activated sludge, and is discharged through an overflow pipe (7). The precipitated activated sludge is returned to the aeration tank (3a) through a pump (18) and a part of the sludge is wasted through a pipe (19) to maintain a constant MLVSS(Mixed-liquor Volatile Suspended Solids) value in the aeration tanks (3a, 3b, 3c).

A conventional activated sludge process for treating a organic waste water containing a high concentration of organic substances was of a long-term aeration type and it is difficult to maintain constant operation conditions or a high efficiency of operation during the long period of operation.

Particularly, in the case of a treatment system for treating a waste water produced from petrochemical industries which usually contains a large amount of organic substances and heavy metals, the overloading causes a toxic effect to microorganisms in the aeration tank so that the treatment efficiency is reduced, or the process becomes shut down. Under such a circumstances, the loading rate should be reduced, which consequently results in an insufficient treatment of waste water and water pollution. Moreover, since the influent(input) flow rate maintains constant regardless of variations in the concentration of organic substances in the waste water, the variations in the concentration of organic substances result in a fluctuation of the loading rate, which give the microorganisms a "shock". These effects of the organic concentration on the microorganisms can be detected only after they appear. Moreover, it takes at the least 30 minutes and at the most 5 days to measure the organic concentration parameters such as COD(Chemical Oxygen Demand), $BOD_5$(Biological Oxygen Demand in 5 days), and TOD(Total Oxygen Demand), which indicate the environmental conditions in the aeration tanks. Accordingly, the effect of the variation of organic concentrations can be removed only several days after they are detected.

Therefore, there has been a need to develop a method and apparatus which enable to operate the waste water treatment plant efficiently and produce an environmentally acceptable effluent by controlling the influent flow rate based on the relationship between an input loading rate (organic concentration×input flow rate) and an actual respiration rate.

There have been several attempts to solve the problems. For example, JP 55-97290A discloses an automatic influent flow rate control system wherein the waste water influent flow rate into the activated-sludge aeration tank is reduced when the measured DO(Dissolved Oxygen) in the aeration tank is lower than a certain value and is increased when the DO becomes above the certain value. JP 2-68196A discloses a loading control system for a waste water treatment apparatus having a plurality of unaeration tanks in which the waste water is fed and a plurality of aeration tanks which is connected to the unaeration tanks, wherein a set DO value is given for each aerobic tank and a flow rate of influent into the unaeration tanks is determined based based on the capacity of the tanks. The influent flow is controlled depending on the set DO. This is possible by accumulating the influent flow rates measured by flow meter and propionic acid concentrations in the effluent line of the anaerobic reactor.

However, the JP 55-97290A has some drawbacks that since the system controls the influent flow rate depending on the DO in the aeration tank, there is a long lag time between the measurement of the DO and control of the flow rate, and this fails to timely response to the over-loading or shock.

SUMMARY OF THE INVENTION

Thus, an object of the invention is to provide a method for biologically treating waste water, particularly containing a high concentration of organic substances or heavy metals, which comprises the steps of:

(a) feeding the waste water into the reactor in which the waste water is biologically degraded;

(b) feeding the waste water via solenoid valves into a respiration chamber at the same flow rate as that of the waste water fed into the reactor and transferring a part of microorganisms from the reactor to the respiration chamber;

(c) detecting the DO(dissolved oxygen) of an influent(=input DO) fed into the respiration chamber and the effluent(= output DO) discharged from the chamber by using a probe located in the chamber;

(d) determining the relationship between a respiration rate and a loading rate using the input and output DO measured in the above (c) by employing the following equations (1) through (3); and $$\frac{dCo(t)}{dt} = \frac{Q}{V} \times [Ci(t) - Co(t)] - R_a(t) \tag{1}$$

wherein,

Co(t): output DO from the respiration chamber at time t

Ci(t): input DO into the respiration chamber at time t $R_a(t)$: actual respiration rate in the respiration chamber at time t Q: output flow rate from the respiration chamber at time t V: volume of the respiration chamber at time t $$L = f(r_a) = Q_a \times Si \quad (2)$$

wherein,
L: loading rate of input flow
$Q_a$: input flow rate into the reactor
Si: TOD(Total Oxygen Demand) of influent $$r_a = R_a / X_v \quad (3)$$

wherein,
$r_a$: actual specific respiration rate
$R_a$: actual respiration rate
$X_v$: mixed-liquor volatile suspended solids
(e) controlling the input flow rate into the reactor so as to maintain the loading rate to a range from 0.1 kg TOD/m³·Day to 10 kg TOD/m·Day based on the relationship derived from the above (d).

Another object of the invention is to provide an apparatus for biologically treating waste water, particularly containing a high concentration of organic substances or heavy metals, by employing a continuous respiration meter.

Another object of the invention is to provide an apparatus for biologically treating waste water, particularly containing a high concentration of organic substances or heavy metals, characterized in that which comprises a continuous respiration meter for determining continuously a dissolved oxygen(DO) within a reactor in which the waste water is biologically degraded; and a control part for determining a relationship between a loading rate and a respiration rate by using the DO value transmitted as an electrical signal from the respiration meter, establishing a set loading rate which is optimum for the reactor, and for transmitting an electrical signal for controlling the waste water input flow rate into the reactor in order to maintain a loading ram of the influent waste water is to be close to the set loading rate.

Another object of the invention is to provide an apparatus for biologically treating waste water, particularly containing a high concentration of organic substances or heavy metals, characterized in that which comprises a continuous respiration meter which is consisted of solenoid valves(8, 9, 10, 11) for guiding the influent flow direction, a respiration chamber(39) wherein the waste water is fed at the same flow rate as that of the waste water into the reactor and is biodegraded by the microorganism moved from the reactor, and a probe(37) for detecting DO in the respiration chamber(39) and transmits the measured DO to a control part as an electrical signal.

The other objects and applications of the present invention will be apparent to the skilled in the art from the detailed description of the invention below.

BRIEF DESCRIPTION OF THE DRAWINGS

In FIG. 5, the — line indicates an input flow rate, the . . . line indicates an actual specific respiration rate, and —. —the line indicates a loading rate.

DETAILED DESCRIPTION OF THE INVENTION

Figure 1:
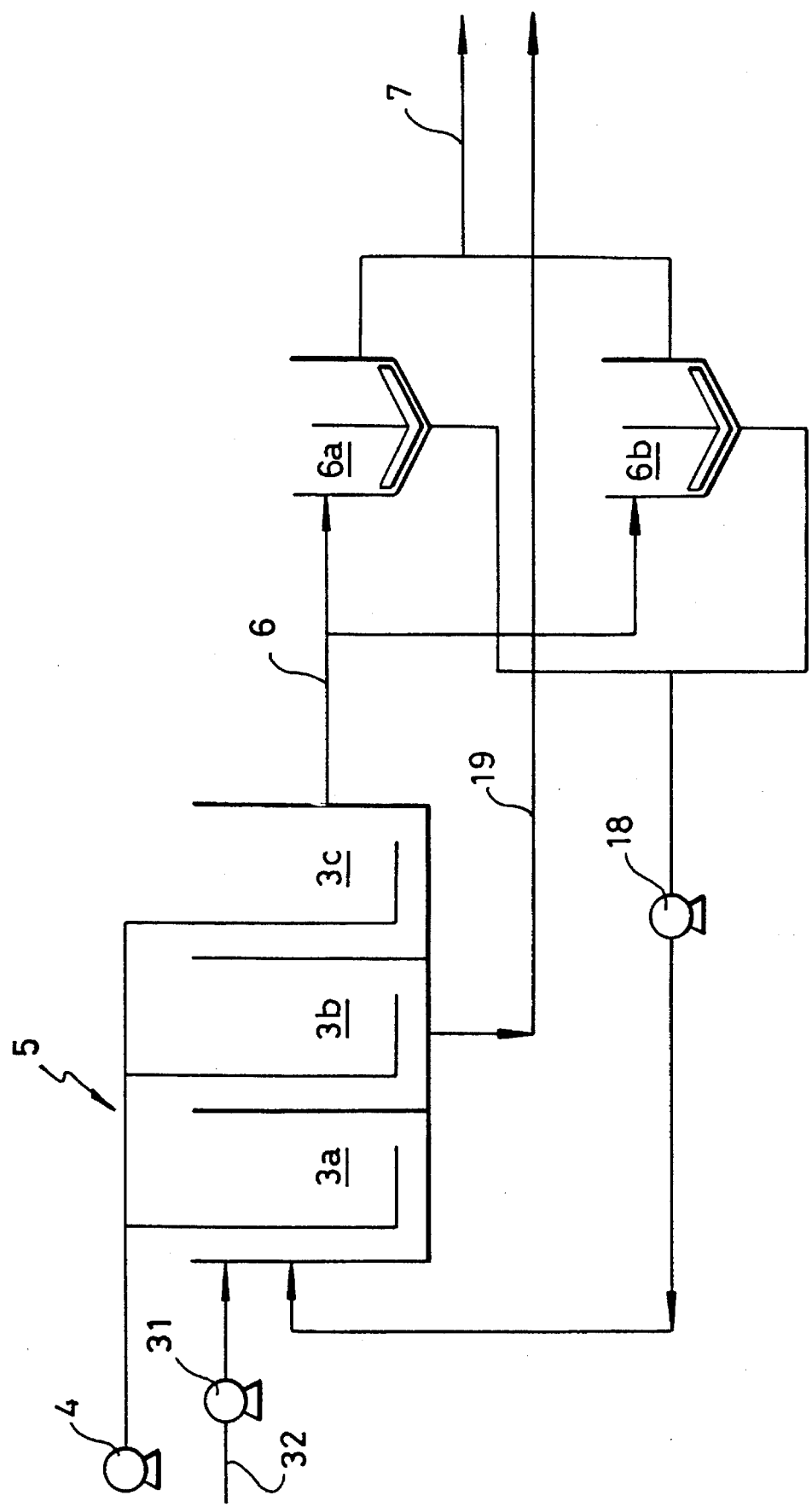
FIG. 1 is a schematic flow diagram showing the conventional activated sludge process.
Figure 2:
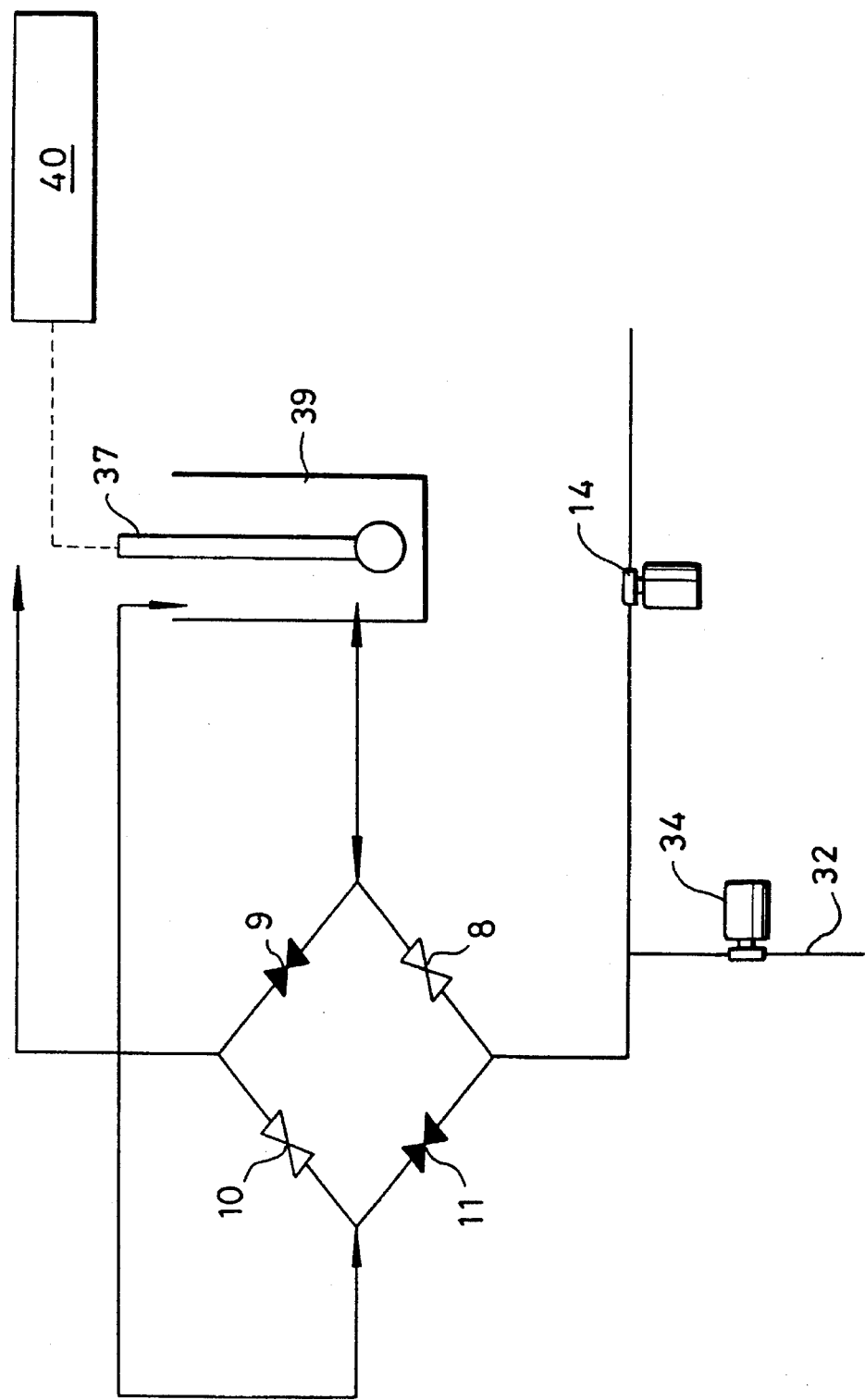
FIG. 2 is a schematic flow diagram showing the continuous respiration meter according to the invention.
Figure 3:
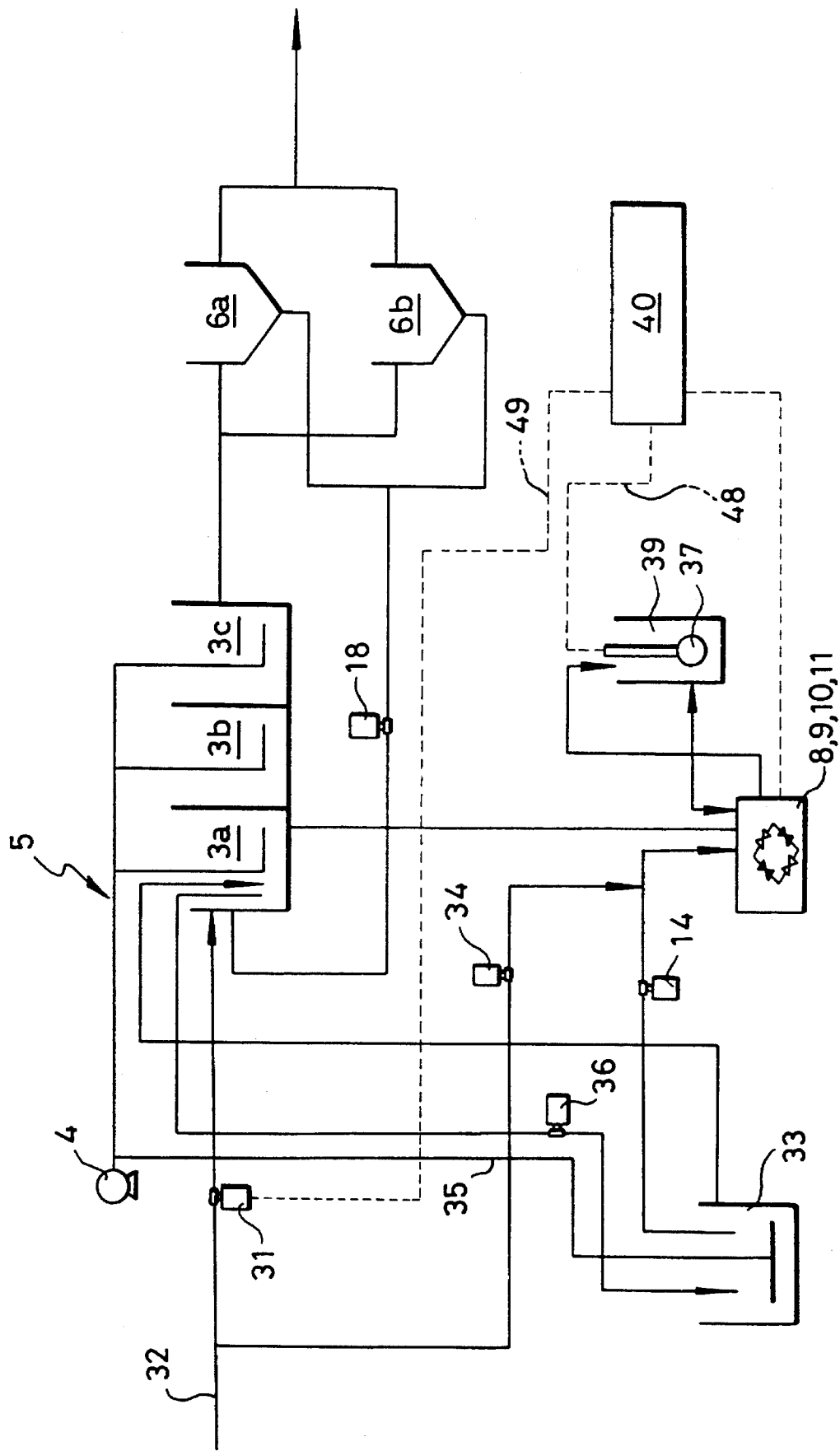
FIG. 3 is a schematic flow diagram showing the waste water treatment system having a continuous respiration meter according to the invention.

To facilitate an understanding of the preferred process and apparatus according to the present invention, reference is made to FIGS. 2 to 3 which show a continuous respiration meter and a waste water treatment system having the continuous respiration meter, respectively. Although these drawings relates to an activated sludge type system, those of skill in the art should recognize the system of the present invention could be identically applied to other waste water treatment systems.

According to the present invention, the input flow rate is controlled so as to maintain a constant actual respiration rate in the aeration tanks(3a, 3b, 3c) wherein the waste water is biologically degraded. As a result thereof, the waste water treatment plant can be operated under stable, efficient, and economic ways for a long period of time.

The continuous respiration meter is an essential feature of the invention and, as shown in FIG. 2, is consisted of solenoid valves(8, 9, 10, 11) for guiding the influent flow direction, a respiration chamber(39) into which the waste water is fed at the same flow rate as that of the waste water fed into the reactor and wherein the waste water is biodegraded by the microorganism moved from the reactor, and a probe(37) for detecting DO in the respiration chamber(39). The measured DO is transmitted to a control part(40) as an electrical signal. T he respiration chamber mimics the reactor and a dissolved oxygen in the influent waste water into a respiration chamber(39) (=input DO) and a dissolved oxygen in the effluent from the respiration chamber(=output DO) correspond to those of the reactors, i.e., aeration tanks(3a, 3b, 3c), respectively. For the invention, the DO values measured with the probe(37) are transmitted as an electrical signal(48) to a control part(40) in which a respiration rate is calculated and a relationship between a loading rate and a respiration rate is derived and a set loading rate which is optimum for the reactor is established. Then, the control part(40) transmits an electrical signal(49) to pump(31) to control the waste water input flow rate into the reactor in order to maintain a loading rate of the influent waste water to be close to the set loading rate.

There had been reported a respiration meter for monitoring a toxic effect of various substances, a shock effect of organic concentration on microorganisms and maximum respiration rate in a laboratory scale. However, the reported respiration meter is employed for monitoring a toxic effect on microorganisms in a laboratory but never been employed for controlling the input flow rate in a waste water treatment system.

For the present invention, the actual respiration rate in the aeration tank is directly measured by using a continuous respiration meter on-site.

When the waste water containing a high concentration of organic substances or heavy metals is fed from a reservoir into the aeration tanks (3a, 3b, 3c) via inlet line (32), the same waste water is fed into the respiration chamber(39) via solenoid valves (8, 9, 10, 11). The flow rate of waste water fed into the respiration chamber is controlled by the pump(34) so as to it is the same as that of waste water fed into the aeration tanks. On the other hand, a part of activated sludge in the aeration tank(3a) is transferred via the solenoid valves(8, 9, 10, 11) to the respiration chamber(39) in order to mimic the system of the aeration tanks(3a, 3b, 3c) in the respiration chamber(39).

Then the DO probe (37) detects the input DO(i.e., dissolved oxygen in the influent into the chamber(39)) and output DO(i.e., dissolved oxygen in the effluent from the chamber(39)), which represent an oxygen consumption rate in the aeration tank(3a) per unit time and unit volume of the aeration tank(3a), at a constant interval of time.

The solenoid valves(8, 9, 10, 11) are operated in such a manner that the opposite valves are identically turned on or off and the adjacent valves are reversely turned on or off. For example, if the valve (8) and its opposite valve (10) are identically turned on, the remaining adjacent valves (9) and (11) are turned off and the input DO is measured. By contrary, when valves (8) and (10) are turned off, the valves (9) and (11) are automatically turned on and the output DO is measured.

When operation conditions of the continuous respiration meter is changed and one tries to obtain a steady-state respiration rate, the measured DO should be recorded until the respiration rate in the respiration chamber (39) reaches steady state. Among the DO values measured during the measurement period, the last input and output DO are used for calculating a respiration rate. The steady state of DO values reaches within 20 seconds for the most cases.

Since the input and output DO values are measured by single DO probe consecutively, one cannot obtain the input and output DO at the same time. Therefore, in order to obtain a respiration rate at time (t), there are need three DO dam: Ci(t-TD), an input DO at time (t-TD); Co(t), an output DO at time (t); and Co(t-TD), an output DO at time (t-TD). The respiration rate can be calculated using the three DO data by the following equation:

$$\frac{dCo(t)}{dt} = \frac{Q}{V} * [Ci(t) - Co(t)] - R_a(t) \quad (1)$$

wherein,

Co(t): output DO from the respiration chamber at time t

Ci(t): input DO into the respiration chamber at time t $R_a(t)$: actual respiration rate in the respiration chamber at time t Q: output flow rate from the respiration chamber at time t V: volume of the respiration chamber at time t TD: DO measurement interval By using the above equation, specific actual respiration rates (ra) for several different loading rates (L) can be calculated and a correlation equation between them is derived as follows:

$$L=f(ra)=Q_a \times Si \quad (2)$$

wherein,

L: loading rate of input flow $Q_a$: input flow rate into reactor

Si: TOD(Total Oxygen Demand) of input flow

To maintain a constant loading rate and produce an environmentally acceptable effulent, one should establish a set loading rate and a corresponding specific actual respiration rate. This is based on the fact that the specific actual respiration rate is a function of the loading rate.

In FIG. 3, in case of non-control mode, a certain amount of sludge is fed via pump (36) into the mixing vessel (33) from the aeration tank (3a, 3b, 3c) and air is supplied through the air line (35) to maintain the DO in the mixing vessel higher than 4.

In case of control mode, the waste water is fed via the input line(32) and pump (34) and sludge is fed via pump(14) into the respiration chamber (39) and the input and output DO of the respiration chamber(39) are measured using the DO probe(37). The DO values are transmitted to the control part(40) as an electrical signal and the respiration rate is calculated based on the above equations (10 to (3), stored, and monitored. The control part(40) is a computer, and derives a relationship between a loading rate and a respiration rate, establishes a set loading rate which is optimum for the reactor and then transmits an electrical signal(49) to pump(31) to control the waste water input flow rate into the reactor in order to maintain a loading rate of the influent waste water to be close to the set loading rate.

Moving averages of respiration rates for 10 minutes are calculated. The specific actual respiration rates ($r_a$) are calculated with the actual respiration rate ($R_a$) and pre-determined MLVSS concentration ($X_v$) by employing the equation:

$$r_a = R_a/X_v \quad (3)$$

and then the control mode is executed to control the input flow rate into the aeration tank to maintain a constant loading rate of the tank.

The specific actual respiration rates calculated at the computer are compared to the upper and lower limits of specific actual respiration rates which are correspond to the pre-determined set loading rate ($L_s$). If a significant fluctuation in the loading rate is observed, the organic concentration, Si(=TOD) is calculated from the equation: L=f($r_a$)= $Q_a \times$Si with an average of specific actual respiration rate ($r_a$) for ten minutes and a known input flow rate into the aeration tank ($Q_a$). And then the influent flow rate ($Q_a$)into the aeration tank is in conformity with the set loading rate ($L_s$) and the corresponding influent flow rate into the respiration chamber (39) are calculated. These values are used to regulate the pumps (31) as an electrical signal (49) and a constant loading rate which should be close to the set loading rate can be achieved to establish a stable operation. And then the air flow rate also can be appropriately regulated, which results in an economic benefit. And there is another advantage to improve a treatment capacity of the aeration tanks.

The present invention will be further illustrated in more detail by way of the following non-limited Examples.

EXAMPLE 1

An activated sludge type waste treatment system as shown in FIG. 3 having three(3) 0.28 m³ aeration tanks and 0.96 l respiration chamber was employed to derive a correlation equation between a respiration rate and a loading rate. The waste water was fed into both of the aeration tank and the respiration chamber at the loading rates shown in Table 1. Respiration rates were calculated depending on the different loading rates and the results are shown in Table 1 and FIG. 4.

TABLE 1

| Loading rate (kg TOD/m³ · day) | Actual respiration rate (mg O₂/l · hr) | Specific actual respiration rate (mg O₂/g VSS · hr) |
| --- | --- | --- |
| 0.378 | 24.3 | 4.47 |
| 0.576 | 21.8 | 4.01 |
| 1.512 | 27.0 | 4.96 |
| 2.117 | 22.39 | 4.33 |
| 2.343 | 32.9 | 8.23 |
| 3.024 | 27.8 | 5.377 |
| 3.175 | 42.0 | 8.26 |
| 3.402 | 35.9 | 7.92 |
| 3.538 | 35.1 | 6.79 |
| 3.620 | 31.73 | 6.37 |
| 3.628 | 38.97 | 6.37 |
| 3.711 | 35.1 | 6.01 |
| 3.740 | 31.74 | 6.71 |
| 3.931 | 47.70 | 7.98 |
| 4.180 | 40.56 | 7.84 |
| 4.309 | 46.5 | 9.69 |
| 4.536 | 36.3 | 9.08 |
| 5.367 | 53.1 | 10.62 |
| 5.836 | 53.4 | 10.68 |
| 5.927 | 52.9 | 11.02 |
| 6.222 | 57.5 | 11.98 |
| 6.456 | 54.6 | 10.92 |
| 7.000 | 53.1 | 10.62 |
| 7.106 | 54.6 | 11.33 |

Figure 4:
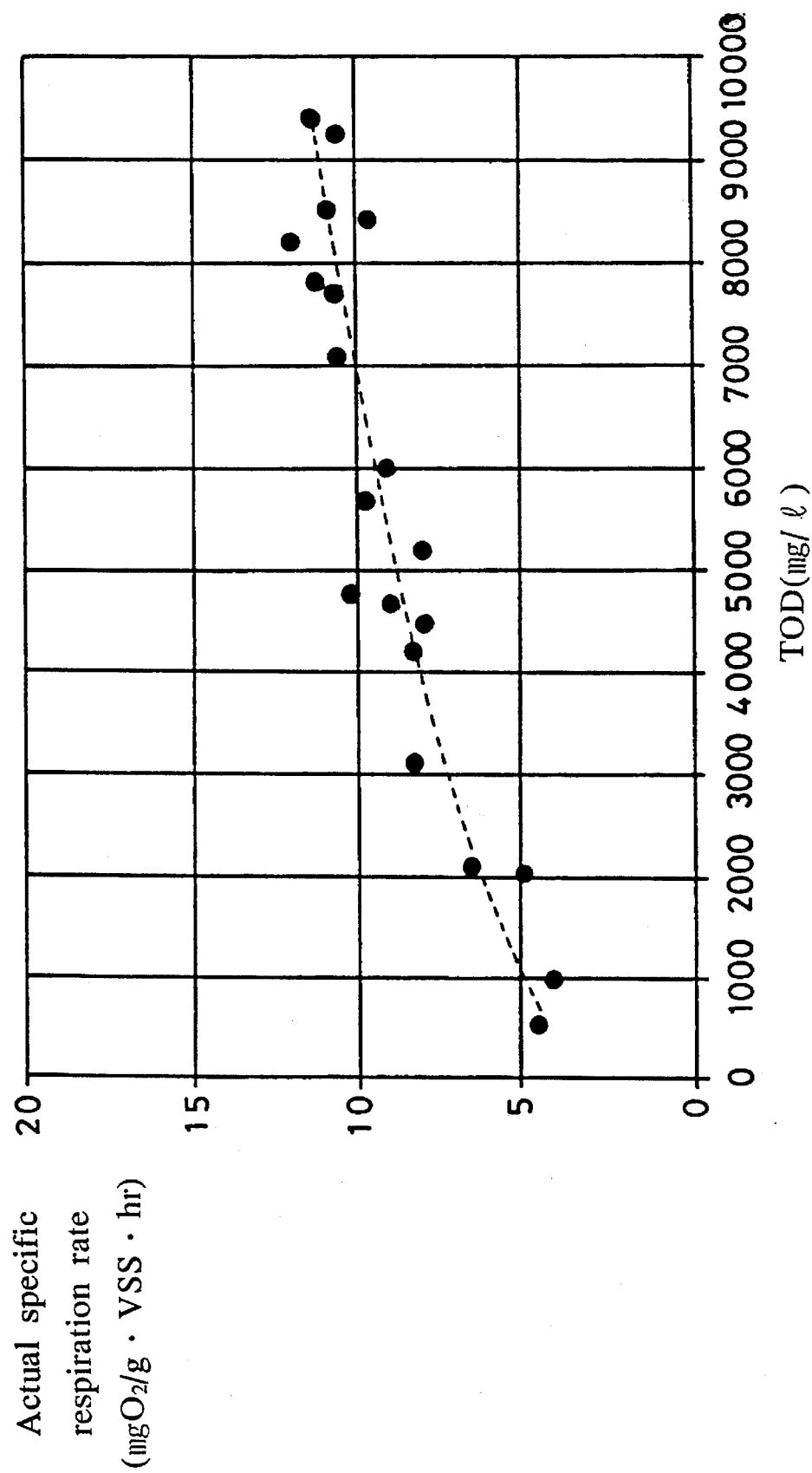
FIG. 4 is a graph showing a relationship between a loading rate and a specific respiration rate, which is obtained in Example 1.

Based on above results shown in Table 1 and FIG. 4, a relationship between a loading rate and an actual respiration rate, and a loading rate and a specific actual respiration rate were obtained as followings:

$$R_a = 43.6 \, L^{1/2} - 30$$

$$r_a = 7.27 \, L^{1/2} - 7.02$$

wherein, L is a volumetric loading rate (kg TOD/m³·day)

EXAMPLE 2

A loading rate control system was operated in the basis of the relationship obtained in Example 1.

Figure 5:
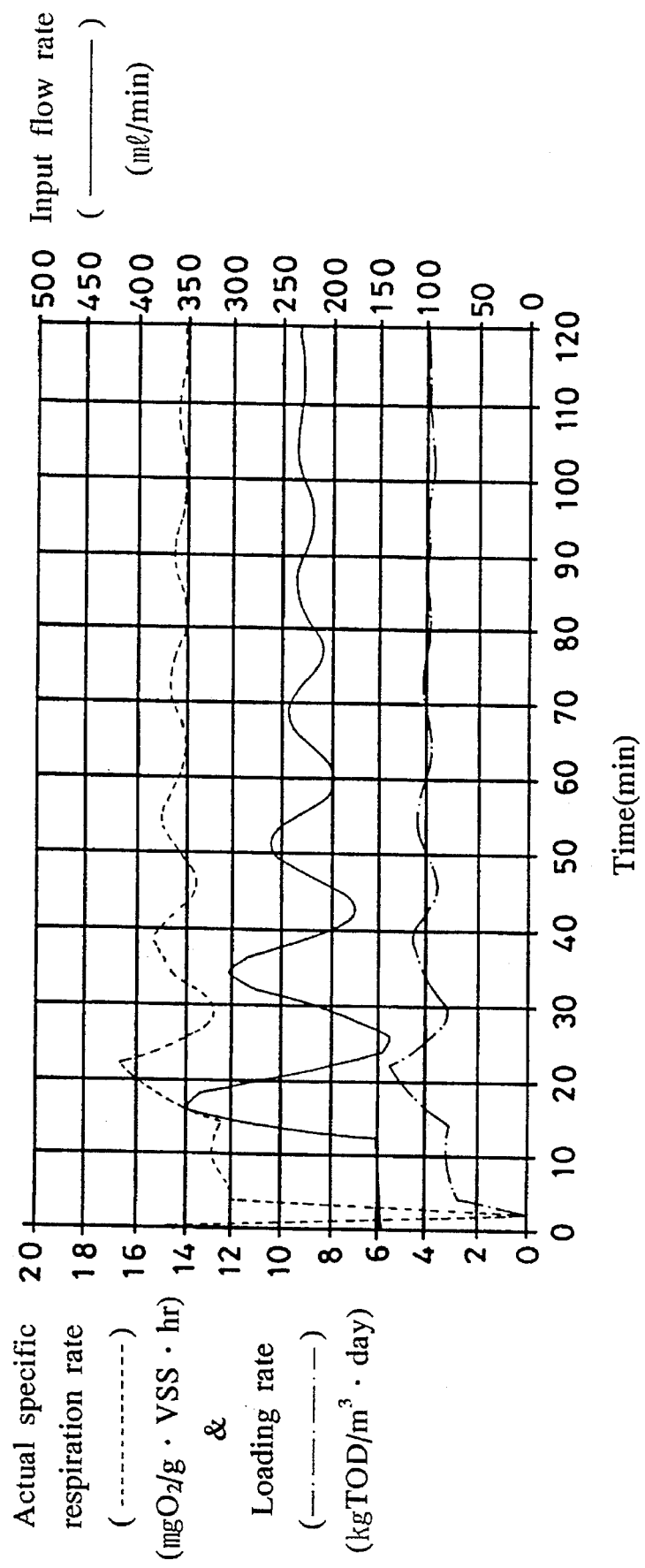
FIG. 5 is a graph showing results of loading control carried out according to one embodiment of the invention.

In this example, the set loading rate was 3.78 kg TOD/m³·day whose corresponding specific actual respiration rate was 14 mg O₂/g VSS·day. The control system was run when the influent TOD was 5000 mg/l. The respiration rate, input flow rate and loading rate in the lapse of time(min) are shown in FIG. 5. As can be seen in FIG. 5, the input flow rate is automatically controlled depending on the fluctuation of the respiration rate in order to constrain the loading rate to the set value and the static state can be accomplished within about 60 minutes.

What is claimed is:

1. A method for biologically treating waste water containing a high concentration of organic substances, wherein said method comprises controlling the input flow rate into aeration tanks, containing microorganisms for degrading said organic substances, so as to maintain a desired substantially constant loading rate in the range of from 0.1 kgTOD/m³·day to 10 kgTOD/m³·day; wherein said control is achieved by measuring the actual respiration rate as a function of the flow rate in a separate respiration chamber, which mimics conditions in the aeration tanks, by carrying out the steps of:

(a) feeding the waste water into said respiration chamber, containing a proportional amount of microorganisms to that in said aeration tanks, at a flow rate proportional to that of the waste water fed into said aeration tanks;

(b) measuring DO (dissolved oxygen) values of influents (input DO) fed into the respiration chamber and DO values of effluents (output DO) discharged from the respiration chamber, as a function of flow rate, with a single probe located in the chamber at a point near one pipe and remote from a second pipe, the direction of flow of said waste water into and out of said chamber through said first and second pipes being controlled by valves such that said single probe measures input DO when flow is in one direction and output DO when the direction of flow is reversed; and (c) calculating specific respiration rates in said respiration chamber from the measured input DO and output DO values, determining the relationship between specific respiration rates in said respiration chamber and loading rates, and adjusting the influent waste water flow rate into the aeration tanks automatically, using said relationship, so that said desired loading rate is maintained substantially constant.

2. The method claim 1, which further comprises storing and activating by aeration said microorganisms in a mixing vessel prior to moving said proportional amount of microorganisms into the respiration chamber in step (a).

3. The method of claim 2, wherein said activation by aeration of microorganisms is achieved by pumping enough air in said mixing vessel to reach a DO higher than 4.

4. The method of claim 1, wherein said respiration rates are determined from measured Dos according to equation 1, $$\frac{dCo(t)}{dt} = \frac{Q}{V} \times [Ci(t) - Co(t)] - R_a(t) \qquad (1)$$

wherein,

Co(t) (mgo₂/l): output DO from the respiration chamber at time t,

Ci(t) (mgo₂/l): input DO from the respiration chamber at time t, $R_a(t)$ (mgo₂/l·hr): actual respiration rate in the respiration chamber at time t, Q (l/hr): output flow rate from the respiration chamber at time t, and V (l): volume of the respiration chamber at time t loading rate is determined from input flow rate using equations 2 and 3, $$L = f(r_a) = Q_a \times Si \qquad (2)$$

wherein,

L (kgtod/m³·day): loading rate, $Q_a$ (m³/day): input flow rate into the reactor, and Si (mgTOD/l): TOD (Total Oxygen Demand) of influent;

$$r_a = R_a / X_v \qquad (3)$$

wherein, $r_a$ (kgo₂/gMLVSS·day): specific actual respiration rate, $R_a$ (mgo₂/l·day): actual respiration rate, and $X_v$ (gMLSVV/l): volume of mixed-liquor volatile suspended solids to calculate an influent flow rate consistent with said desired substantially constant loading rate.

5. An apparatus for biologically treating waste water, which comprises:

one or more aeration tanks in which the waste water is biologically degraded by microorganisms;

a respiration chamber in which the waste water is biologically degraded by microorganisms under conditions which mimic the aeration chambers, and in which dissolved oxygen (DO) levels are measured; wherein said respiration chamber is provided with a probe for measuring DO values therein;

input lines in fluid communication with said aeration tanks and said respiration chamber, for feeding waste water into said respiration chamber and into said aeration tanks, said input lines being equipped with pumps for controlling the flow rate of said waste water, the input line to said respiration chamber being equipped with valves for controlling waste water flow direction;

input and output pipes in fluid communication with said respiration chamber, one pipe communicating with the chamber in close proximity to said probe, the other communicating with said chamber remote from said probe, each said pipe being in fluid communication with said valves for controlling the waste water flow direction;

a control part for determining a relationship between loading rates and respiration rates in said respiration chamber using the DO values measured by said probe, the electrical signals from said control part being used to control the input flow rate into said aeration tanks to maintain a steady state at a desired loading rate.

6. The apparatus of claim 5, which further comprises a mixing vessel for activating sludge and storing the activated sludge, said mixing vessel being provided with an air line for aeration of sludge, said mixing vessel being in fluid communication with one or both of said aeration tanks and said respiration chamber through conduits provided with valves and pumps to transport activated sludge between said mixing vessel and said aeration tanks and/or said respiration chamber.

7. The apparatus of claim 5, wherein said valves are solenoid valves.

* * * * *